United States Patent
Donelon et al.

(10) Patent No.: US 10,604,438 B2
(45) Date of Patent: Mar. 31, 2020

(54) PROCESS FOR JOINING OPAQUE FUSED QUARTZ TO CLEAR FUSED QUARTZ

(71) Applicant: HERAEUS QUARTZ AMERICA LLC, Austin, TX (US)

(72) Inventors: Matthew Donelon, Round Rock, TX (US); Ashur J. Atanos, San Jose, CA (US); Arturo Sanchez, Manor, TX (US); Kwang Chul Kim, Round Rock, TX (US)

(73) Assignee: HERAEUS QUARTZ AMERICA LLC, Austin, TX (US)

( * ) Notice: Subject to any disclaimer, the term of this patent is extended or adjusted under 35 U.S.C. 154(b) by 261 days.

(21) Appl. No.: 15/743,738

(22) PCT Filed: Jul. 15, 2015

(86) PCT No.: PCT/US2015/040552
§ 371 (c)(1),
(2) Date: Jan. 11, 2018

(87) PCT Pub. No.: WO2017/011002
PCT Pub. Date: Jan. 19, 2017

(65) Prior Publication Data
US 2018/0201534 A1     Jul. 19, 2018

(51) Int. Cl.
*C03B 23/207* (2006.01)
*C03B 19/06* (2006.01)
*C03B 20/00* (2006.01)
*C03B 23/20* (2006.01)

(52) U.S. Cl.
CPC .......... *C03B 23/207* (2013.01); *C03B 19/066* (2013.01); *C03B 20/00* (2013.01); *C03B 23/20* (2013.01)

(58) Field of Classification Search
CPC ............. C03B 23/207; C03B 37/01211; C03B 37/0753; C03B 37/15
(Continued)

(56) References Cited

U.S. PATENT DOCUMENTS 5,185,020 A    2/1993 Satoh et al.
5,651,827 A    7/1997 Aoyama et al.
(Continued)

FOREIGN PATENT DOCUMENTS

EP    0909743       1/2002
JP    08119650 A  * 5/1996  ............. C03B 19/09
(Continued)

OTHER PUBLICATIONS

International Search Report and Written Opinion dated Feb. 29, 2016 by the European Patent Office ("EPO") in its capacity as International Searching Authority ("ISA") of counterpart international patent application No. PCT/US2015/040552.
(Continued)

*Primary Examiner* — Cynthia Szewczyk
(74) *Attorney, Agent, or Firm* — Stradley Ronon Stevens & Young, LLP (57) ABSTRACT

Processes for fusing opaque fused quartz to clear fused quartz to form ultraviolet light transmission windows comprise surrounding a clear fused quartz ingot with an opaque fused quartz sleeve or opaque fused quartz particles, then heating the clear and opaque fused quartz together in a furnace, past the transition temperature of the opaque fused quartz, in order to join the two types of quartz together around the perimeter of the clear fused quartz ingot, but without substantial mixing beyond the interface.

18 Claims, 3 Drawing Sheets

(58) Field of Classification Search
USPC .................................. 65/404, 412, 41, 42, 58
See application file for complete search history.

(56) References Cited

U.S. PATENT DOCUMENTS

| | | | |
|---|---|---|---|
| 5,674,792 A | 10/1997 | Moritz et al. | |
| 5,736,206 A | 4/1998 | Englisch et al. | |
| 5,885,071 A * | 3/1999 | Watanabe | C03B 19/095 |
| | | | 428/34.1 |
| 5,972,488 A * | 10/1999 | Nagata | C03B 19/09 |
| | | | 428/304.4 |
| 2003/0041623 A1 * | 3/2003 | Werdecker | C03B 19/09 |
| | | | 65/17.6 |
| 2006/0038470 A1 | 2/2006 | Maul et al. | |
| 2014/0053772 A1 | 2/2014 | Yamagata | |

FOREIGN PATENT DOCUMENTS

| | | | | |
|---|---|---|---|---|
| JP | 09301726 A * | 11/1997 | ........... | C03B 19/095 |
| JP | 2000086383 A * | 3/2000 | ........... | C03B 19/095 |
| JP | 2013-121902 | 6/2013 | | |
| WO | 2015/099659 | 7/2015 | | |

OTHER PUBLICATIONS

Office Action received from the Japanese Patent Office (including an English translation) for counterpart Japanese Patent Application No. 2018-500934 dated May 8, 2019.

* cited by examiner

PROCESS FOR JOINING OPAQUE FUSED QUARTZ TO CLEAR FUSED QUARTZ

TECHNICAL FIELD

The disclosure relates generally to the field of ultraviolet transmission window manufacture. More particularly, the disclosure relates to processes for attaching an opaque fused quartz perimeter to a clear fused quartz window. The resulting structure may be used as a thermal or optical insulator, particularly during ultraviolet light curing stages of semiconductor wafer manufacture.

BACKGROUND

During semiconductor wafer manufacture, dielectric films (e.g., UV sensitive amorphous composite or oxides) are deposited on the wafer surface. The dielectric films are cured using ultraviolet (UV) light. In more recent processes, high energy UV (e.g., ultraviolet excimer lamps) are used to enhance the curing speed.

The UV light is passed from the light source through a transmission window, and into the curing chamber, where the light makes contact with the dielectric film. Generally, the transmission window is held in place within the UV chamber between two plates. In addition, an O-ring is placed between the junction of each plate and the adjacent face of the transmission window. The O-ring prevents out-gassing/leakage of the gasses produced during the curing process from the plate-window junction, and further prevents leakage of air into the chamber.

But due to the high heat and light intensity generated from the UV lamp, particularly with the more modern high energy UV lights, such O-ring seals break down quickly. Damaged seals risks out-gassing, particle generation, and leakage around the transmission window. Moreover, faster breakdown means frequent downtime for maintenance of the curing chambers to replace the O-rings, with attendant cost and lost productivity. Accordingly, there is a need in the art to better protect O-rings from UV radiation.

SUMMARY

A process for fusing an opaque fused quartz perimeter to a clear fused quartz ingot comprises providing a sleeve of opaque fused quartz surrounding a void having a first width and extending from the top plane of the sleeve through the bottom plane of the sleeve, inserting a clear fused quartz ingot having a second width into the void, wherein the second width is slightly narrower than the first width such that substantially no gap exists between the inner sidewalls of the sleeve and the outer sidewalls of the ingot, placing the clear fused quartz ingot and sleeve in a mold, heating the mold containing the ingot and surrounding sleeve in a melting furnace, said heating taking place under a vacuum, until the opaque fused quartz fuses to the clear fused quartz ingot to form a clear fused quartz ingot comprising an opaque fused quartz perimeter, and annealing the clear fused quartz ingot comprising an opaque fused quartz perimeter. The sleeve may comprise a unitary sleeve. The sleeve may comprise a plurality of opaque fused quartz bands.

The opaque fused quartz may comprise OM® 100 opaque fused quartz (Heraeus Quarzglas GmbH & Co. KG). The opaque fused quartz may have a density of from about 2.12 to about 2.19 g/cm$^3$, and a porosity of from about 2% to about 4.5% per unit volume, and at least about 80% of the pores in the opaque fused quartz may have a bubble size of from about 15 microns to about 45 microns and preferably less than about 20 microns. The opaque fused quartz may have a Young's modulus of about 54 kN/mm$^2$, and a three-point bending strength of about 84 N/mm$^2$. The opaque fused quartz may have a direct spectral transmission of approximately 0.2 to 3% in a wavelength range of $\lambda$=190 nm to $\lambda$=4990 nm and a diffuse reflectance of at least 60% in a wavelength range of $\lambda$=190 nm to $\lambda$=2500 nm.

The process may further comprise cutting the clear fused quartz ingot comprising an opaque fused quartz perimeter along an axis perpendicular to the vertical axis of the fused ingot to form slices of the fused ingot. The slices may optionally be machined, polished, or both, which further processing steps may be used to form a UV light transmission window.

In the window, the fused quartz perimeter preferably is capable of transmitting less than about 10% of the UV light transmitted from a UV light source. In the window, the fused quartz perimeter preferably is capable of transmitting less than about 5% of the UV light transmitted from a UV light source. In the window, the fused quartz perimeter preferably is capable of transmitting less than about 3% of the UV light transmitted from a UV light source. In the window, the fused quartz perimeter preferably is capable of transmitting less than about 1% of the UV light transmitted from a UV light source. The UV light source may be a high intensity UV light source. The UV light source may be an excimer UV light source.

A process for fusing an opaque fused quartz perimeter to a clear fused quartz unit comprises machining a ledge around at least a portion of the perimeter of a clear fused quartz unit, heating an opaque fused quartz welding rod to at least its transition temperature to soften or liquefy the opaque fused quartz, then depositing the softened or liquefied opaque fused quartz into the ledge, and then annealing the softened or liquefied opaque fused quartz within the ledge, thereby fusing the opaque fused quartz to the clear fused quartz. The ledge may be machined to a depth of about 3 mm, measured from the horizontal plane of the top or bottom of the clear fused quartz unit. The heat source may comprise a furnace or a welding torch.

The opaque fused quartz of the welding rod may comprise OM® 100 opaque fused quartz (Heraeus Quarzglas GmbH & Co. KG Heraeus Quarzglas Verwaltungsgesellschaft mbH). The opaque fused quartz may comprise OM® 100 opaque fused quartz (Heraeus Quarzglas GmbH & Co. KG Heraeus Quarzglas Verwaltungsgesellschaft mbH). The opaque fused quartz may have a density of from about 2.12 to about 2.19 g/cm$^3$, and a porosity of from about 2% to about 4.5% per unit volume, and at least about 80% of the pores in the opaque fused quartz may have a bubble size of from about 15 microns to about 45 microns and preferably less than about 20 microns. The opaque fused quartz may have a Young's modulus of about 54 kN/mm$^2$, and a three-point bending strength of about 84 N/mm$^2$. The opaque fused quartz may have a direct spectral transmission of approximately 0.2 to 3% in a wavelength range of $\lambda$=190 nm to $\lambda$=4990 nm and a diffuse reflectance of at least 60% in a wavelength range of $\lambda$=190 nm to $\lambda$=2500 nm.

The process may further comprise machining and/or polishing at least the opaque fused quartz perimeter, which further processing steps may be used to form a UV light transmission window. In the window, the fused quartz perimeter preferably is capable of transmitting less than about 10% of the UV light transmitted from a UV light source. In the window, the fused quartz perimeter preferably is capable of transmitting less than about 5% of the UV light transmitted from a UV light source. In the window, the fused quartz perimeter preferably is capable of transmitting less than about 3% of the UV light transmitted from a UV light source. In the window, the fused quartz perimeter preferably is capable of transmitting less than about 1% of the UV light transmitted from a UV light source. The UV light source may be a high intensity UV light source. The UV light source may be an excimer UV light source.

The opaque fused quartz welding rod may comprise a rod of opaque fused quartz that has been heated and pulled in order to reduce the original width or diameter of the rod by about 3-fold, about 4-fold, or about 5-fold. The rod may comprise any suitable shape, including a cylindrical shape, triangular shape, or other polygonal shape.

A process for fusing an opaque fused quartz perimeter to a clear fused quartz ingot comprises placing a clear fused quartz ingot into a mold, and surrounding the clear fused quartz ingot with particles of opaque fused quartz. The clear fused quartz ingot coated with opaque fused quartz particles may then be removed from the mold, and the removed composite may be sintered outside of the mold, or alternatively may be sintered inside of the mold, until the opaque fused quartz particles fuse to each other and to the clear fused quartz ingot to form a clear fused quartz ingot comprising an opaque fused quartz perimeter, and annealing the clear fused quartz ingot comprising an opaque fused quartz perimeter. The surrounding step may comprise depositing a liquid slurry containing the particles around the ingot, and removing the fluid portion of the slurry. Removing the liquid portion of the slurry comprises facilitating evaporation of the liquid.

The opaque fused quartz may comprise OM® 100 opaque fused quartz (Heraeus Quarzglas GmbH & Co. KG Heraeus Quarzglas Verwaltungsgesellschaft mbH). The opaque fused quartz may have a density of from about 2.12 to about 2.19 g/cm$^3$, and a porosity of from about 2% to about 4.5% per unit volume, and at least about 80% of the pores in the opaque fused quartz may have a bubble size of from about 15 microns to about 45 microns and preferably less than about 20 microns. The opaque fused quartz may have a Young's modulus of about 54 kN/mm$^2$, and a three-point bending strength of about 84 N/mm$^2$. The opaque fused quartz may have a direct spectral transmission of approximately 0.2 to 3% in a wavelength range of $\lambda$=190 nm to $\lambda$=4990 nm and a diffuse reflectance of at least 60% in a wavelength range of $\lambda$=190 nm to $\lambda$=2500 nm.

The process may further comprise cutting the clear fused quartz ingot comprising an opaque fused quartz perimeter along an axis perpendicular to the vertical axis of the fused ingot to form slices of the fused ingot. The slices may optionally be machined, polished, or both, which further processing steps may be used to form a UV light transmission window.

In the window, the fused quartz perimeter preferably is capable of transmitting less than about 10% of the UV light transmitted from a UV light source. In the window, the fused quartz perimeter preferably is capable of transmitting less than about 5% of the UV light transmitted from a UV light source. In the window, the fused quartz perimeter preferably is capable of transmitting less than about 3% of the UV light transmitted from a UV light source. In the window, the fused quartz perimeter preferably is capable of transmitting less than about 1% of the UV light transmitted from a UV light source. The UV light source may be a high intensity UV light source. The UV light source may be an excimer UV light source.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following figures.

FIG. 4 shows a cylindrically-shaped clear fused quartz ingot comprising an opaque fused quartz perimeter. The opaque fused quartz is fused to the outer sidewalls of a clear fused quartz ingot that is in the center. The opaque fused quartz began as a plurality of rings stacked on top of each other to form a sleeve into which the clear fused ingot was placed prior to heating for fusion of the sleeve onto the ingot to form the fused ingot. In this figure, the opaque fused quartz is shown as stacked rings to illustrate that stacked rings were initially used to form the sleeve, but it is to be understood that during the fusion process, the rings themselves fuse together as well as to the clear fused quartz ingot such that demarcation lines and seams are not necessarily visible to the naked eye, to the extent they remain at all, following the fusion and annealing processes. The lines, if visible, may demarcate cut points, where the fused ingot may be sliced prior to further processing into a UV light transmission window.

DETAILED DESCRIPTION

It has been observed in accordance with the disclosure that opaque fused quartz may be fused to clear fused quartz in a furnace, with structural integrity of the fused product maintained. It has been further observed that traditional glass welding techniques to fuse opaque fused quartz to clear fused quartz can be enhanced by reducing the diameter reduction when pulling opaque fused quartz to prepare welding rods. Maintaining a greater diameter of the opaque fused quartz rod was observed to better maintain the opacity such that the opaque fused quartz, following melting/welding and fusion to clear fused quartz, has minimal ultraviolet (UV) light transmission. Accordingly, the disclosure features processes for fusing opaque fused quartz to clear fused quartz, with the opaque fused quartz serving to minimize UV light transmission through a portion of the fused (opaque+clear) product produced from these processes.

Figure 3:
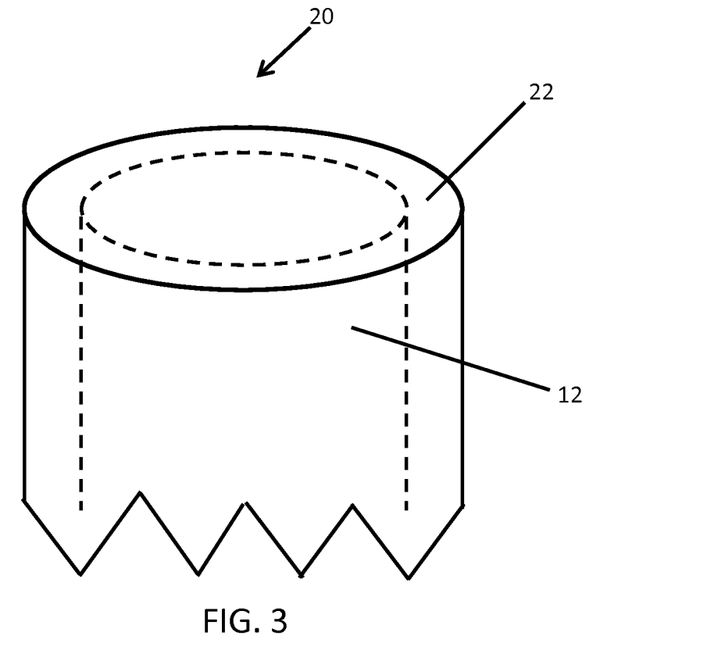
FIG. 3 shows a cylindrically-shaped clear fused quartz ingot comprising an opaque fused quartz perimeter. The opaque fused quartz is fused to the outer sidewalls of a clear fused quartz ingot that is in the center. The opaque fused quartz began as a unitary sleeve into which the clear fused quartz ingot was placed prior to heating for fusion of the sleeve onto the ingot, to form the fused ingot.
Figure 4:
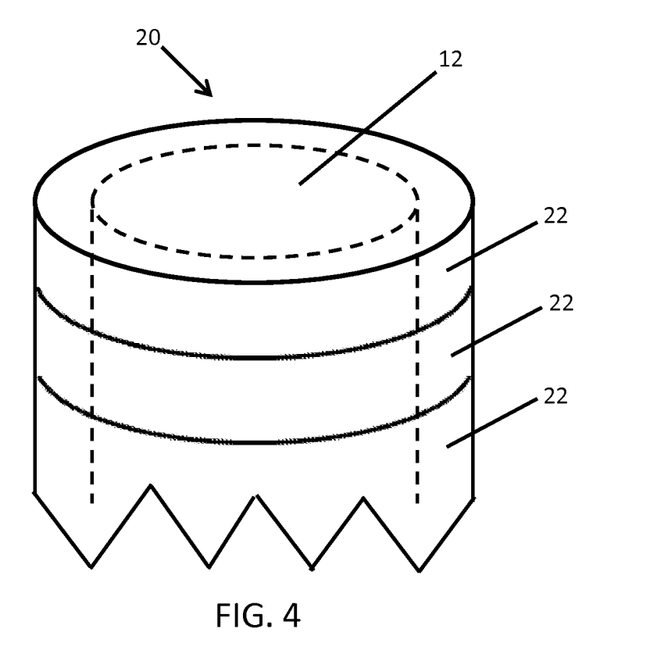

In some aspects, a process for fusing opaque fused quartz to clear fused quartz comprises fusing a sleeve of opaque fused quartz to the outer sidewall surfaces of a clear fused quartz ingot. Following fusion, a fused ingot is produced, with clear fused quartz center having an opaque fused quartz perimeter. Such an ingot is shown, for example, in FIGS. 3 and 4. In FIG. 3 and FIG. 4, the fused ingot 20 comprises a clear fused quartz 12 center (formerly a clear fused quartz 10 ingot) and an opaque fused quartz 22 perimeter (formerly an opaque fused quartz 22 sleeve).

As part of the fusion, the process comprises placing a sleeve of opaque fused quartz in a mold. The sleeve of opaque fused quartz has inner sidewalls that surround a void. The void extends from the top plane of the sleeve through the bottom plane of the sleeve, as it is preferred that the sleeve of opaque fused quartz does not have a lid that closes off either or both of the top or bottom of the sleeve.

The opaque fused quartz sleeve may be a unitary sleeve that has sufficient height to accommodate a similarly sized clear fused quartz ingot. In some aspects, the sleeve may comprise a plurality of smaller sleeves or bands that are stacked on top of each other to obtain the desired height. During the heating and fusion process (as described below), the stacked sleeves or bands fuse together as well as to the clear fused quartz ingot. A stacked sleeve or band configuration is illustrated in FIG. 4, where a plurality of opaque fused quartz 22 bands or sleeves are stacked to a height equivalent to the height of the clear fused quartz 12 ingot inside of the stack. Following fusion, there are preferably no seams as the sleeves or bands that were stacked on top of each other fuse together.

The sleeve or bands may comprise any suitable shape. In FIG. 3 and FIG. 4, the opaque fused quartz 22 is shown in a cylindrical shape, such that the sleeve used to produce the fused ingot 20 shown in FIG. 3 and FIG. 4 had a cylindrical shape. But the sleeve or bands may have a square or rectangular shape, triangular shape, hexagonal shape, octagonal shape, or any other polygonal shape having any desired number of sides and any desired configuration (e.g., trapezoidal, parallelogram, uneven side length, etc.).

Inside the void of the opaque fused quartz, a clear fused quartz ingot may be inserted. In some aspects, the clear fused quartz ingot is placed inside of the void of the opaque fused quartz sleeve following placement of the sleeve inside of the mold. In some aspects, the clear fused quartz ingot is placed inside of the void of the opaque fused quartz sleeve, and then both pieces are placed inside of the mold at the same time.

It is preferred that the clear fused quartz ingot has a width that is slightly narrower than the width of the void inside of the opaque fused quartz sleeve such that substantially no gap, or a small gap, exists between the inner sidewalls of the sleeve and the outer sidewalls of the ingot. In some aspects, there is a slip-fit gap of from about 1 mm to about 10 mm, from about 2 mm to about 6 mm, from about 3 mm to about 5 mm, or from about 4 mm to about 6 mm between the inner sidewalls of the sleeve and the outer sidewalls of the ingot. The slip fit gap may be about 3 mm, about 4 mm, about 5 mm, or about 6 mm in width. The shape of the clear fused quartz ingot is also preferably the same shape as the void, such that the ingot matches the sleeve.

In some aspects, the opaque fused quartz may comprise a plurality of particles or powder of the opaque fused quartz. Such particles or powder are preferably placed around the outer sidewalls of the clear fused quartz ingot while the clear fused quartz ingot is situated in the mold. Thus, for example, the clear fused quartz ingot is surrounded by the particles or powder of opaque fused quartz. The particles or powder may be deposited around the clear fused quartz ingot in a dry form, but in preferred aspects are deposited in the form of a slurry—e.g., with the particles suspended in an appropriate liquid carrier. The liquid carrier may then be removed via draining and/or evaporation, which may be facilitated with a vacuum and/or heat.

After the opaque fused quartz sleeve or opaque fused quartz particles or powder and clear fused quartz ingot are together inside of the mold, the process may comprise removing the clear fused quartz ingot coated with opaque fused quartz particles from the mold (as a composite), then sintering the composite into a uniform body. Sintering may comprise heating the composite in a furnace until the at least the opaque fused quartz exceeds its transition temperature, such that at least the opaque fused quartz softens and may then fuse with the clear fused quartz. The clear fused quartz may also be softened if the transition temperature of the opaque fused quartz is the same as or higher than the transition temperature of the clear fused quartz. In preferred aspects, the heating occurs under a vacuum.

Particle/powder fusion may comprise sintering within the furnace. Following fusion, there are preferably no seams between former particles because adjacent particles fuse together.

Figure 5:
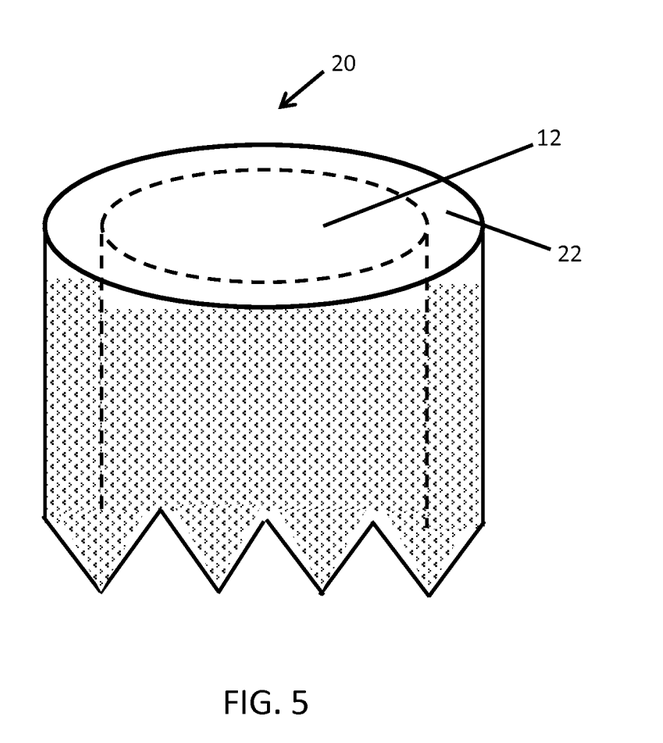
FIG. 5 shows a cylindrically-shaped clear fused quartz ingot comprising an opaque fused quartz perimeter. The opaque fused quartz is fused to the outer sidewalls of a clear fused quartz ingot that is in the center. The opaque fused quartz began as particles or a powder placed around the clear fused quartz ingot prior to heating for fusion to form the fused ingot. In this figure, the opaque fused quartz is shown with stippling to illustrate that particles were initially used, but it is to be understood that during the fusion process, the particles themselves fuse together as well as to the clear fused quartz ingot such that demarcation lines between particles and unfused particles, if any, are not necessarily visible to the naked eye, following the fusion and annealing processes.
Figure 6:
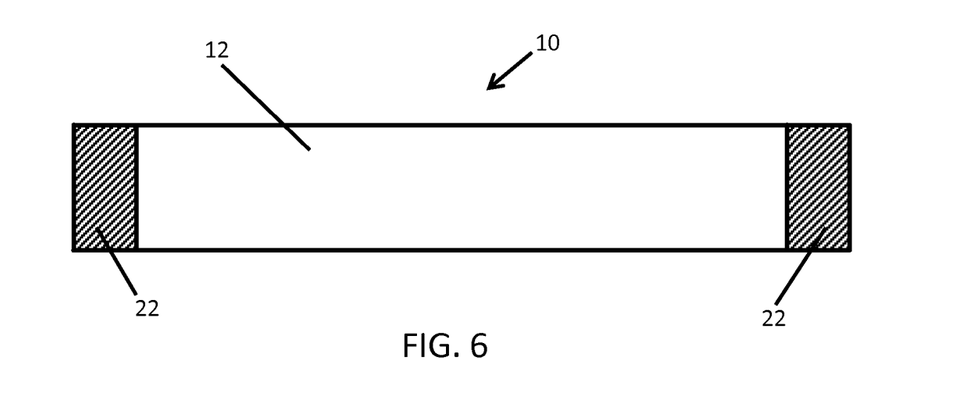
FIG. 6 shows a cut-away view of a UV light transmission window, including a perimeter of opaque fused quartz on the edges of the window, for example, as produced by fusing a opaque fused quartz sleeve or particles to a clear fused quartz ingot.

The heating process proceeds until the opaque fused quartz fuses to the clear fused quartz ingot to form a clear fused quartz ingot comprising an opaque fused quartz perimeter (also referred to herein as a fused ingot). Following the formation of a fused ingot, the fused ingot is preferably annealed. A non-limiting example of a fused ingot 20 is shown in FIG. 3, FIG. 4 and FIG. 5, with a clear fused quartz 12 center surrounded by an opaque fused quartz 22 perimeter. A cut-away view is shown in FIG. 5, with the opaque fused quartz 22 surrounding the clear fused quartz 12.

Following the formation of a fused ingot 20, the fused ingot 20 may be cut into smaller units. Thus, the process may further comprise cutting the clear fused ingot along an axis perpendicular to the vertical axis to form units of a desired thickness. These units comprise a clear fused quartz center with an opaque fused quartz perimeter. Following the cutting, the units may be further machined and/or polished to form a finished product, which preferably is a UV light transmission window comprising an opaque fused quartz perimeter.

The UV light transmission window allows transmission of substantially all of the UV light from a UV light source to pass through the clear fused quartz center portion. But the opaque fused quartz perimeter blocks UV light transmission through the perimeter portion. Preferably, less than about 10% of the UV light from a UV light source passes through the opaque quartz perimeter. In some aspects, less than about 8% of the UV light from a UV light source passes through the opaque quartz perimeter. In some aspects, less than about 5% of the UV light from a UV light source passes through the opaque quartz perimeter. In some aspects, less than about 4% of the UV light from a UV light source passes through the opaque quartz perimeter. In some aspects, less than about 3% of the UV light from a UV light source passes through the opaque quartz perimeter. In some aspects, less than about 2% of the UV light from a UV light source passes through the opaque quartz perimeter. In some aspects, less than about 1% of the UV light from a UV light source passes through the opaque quartz perimeter.

Figure 1:
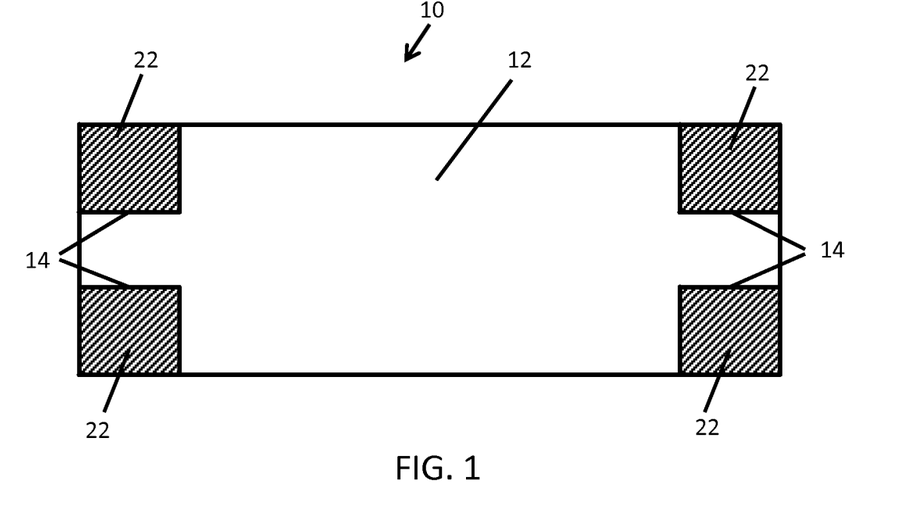
FIG. 1 shows a cut-away view of a UV light transmission window, including a perimeter of opaque fused quartz on the top and bottom faces of the window, which opaque fused quartz is seated on a ledge of clear fused quartz.

In some aspects, a process for fusing opaque fused quartz to clear fused quartz comprises machining a ledge around at least a portion of the perimeter of a piece of clear fused quartz. The ledge may be machined around the perimeter of the top of the clear fused quartz and/or the bottom of the clear fused quartz. An example of a ledge is shown in FIG. 1, which shows a cross-section of a UV light transmission window 10. As shown, the ledge 14 has been machined into the top and the bottom of the clear fused quartz 12 portion of the window 10. The void left by machining the ledge 14 into the clear fused quartz 12 has been filled with opaque fused quartz 22.

The ledge may be machined to a depth of from about 1 mm to about 10 mm (from the top plane and/or the bottom plane). The ledge may machined to a depth of from about 1 mm to about 5 mm, from about 1 mm to about 4 mm, from about 1 mm to about 3 mm, from about 2 mm to about 8 mm, from about 2 mm to about 6 mm, from about 2 mm to about 5 mm, from about 2 mm to about 4 mm, from about 3 mm to about 9 mm, from about 3 mm to about 7 mm, from about 3 mm to about 5 mm, or from about 4 mm to about 6 mm. The ledge may be machined to a depth of about 1 mm, about 2 mm, about 3 mm, about 4 mm, about 5 mm, about 6 mm, about 7 mm, about 8 mm, about 9 mm, or about 10 mm.

Following the machining step, a void remains where a portion of the clear fused quartz was removed. The void may then be filled with opaque fused quartz, which is fused to the ledge and adjacent clear fused quartz sidewalls. The opaque fused quartz is preferably welded into this void, although the opaque fused quartz may also be fused via heating or sintering in a furnace, for example, as described above. In these latter cases, an appropriately sized opaque fused quartz piece or opaque fused quartz particles is/are placed into the void, and the combined unit is placed in a furnace for fusion.

In aspects in which welding is employed, the welding comprises heating an opaque fused quartz welding rod through its transition temperature to soften or liquefy the opaque fused quartz, and then depositing the softened or liquefied opaque fused quartz on top of the ledge and into the void. The opaque fused quartz welding rod preferably is obtained by heating and stretching a larger diameter/width opaque fused quartz rod, which stretching (aka pulling) reduces the original diameter or width of the rod by from about 2-fold to about 6-fold (e.g., the pulled diameter of the welding rod is about ½ to about ⅙ of the original diameter or width). The pulled opaque fused quartz rod may have a diameter that has been reduced by from about 0.2-fold to about 8-fold, from about 0.5-fold to about 10-fold, from about 1-fold to about 7-fold, from about 1-fold to about 4-fold, from about 1-fold to about 5-fold, from about 2-fold to about 5-fold, from about 2-fold to about 4-fold, or from about 2-fold to about 3-fold. The pulled opaque fused quartz rod may have a diameter that has been reduced by about 0.2-fold, about 0.5-fold, about 1-fold, about 2-fold, about 3-fold, about 4-fold, about 5-fold, about 6-fold, about 7-fold, about 8-fold, about 9-fold, or about 10-fold. A three-fold reduction in diameter or width (from pulling) is preferred.

Once the softened or liquefied opaque fused quartz has been deposited on the ledge (and in the machined void), the opaque fused quartz may be annealed, thereby fusing the opaque fused quartz to the clear fused quartz. Following the fusion, a clear fused quartz unit having an opaque fused quartz perimeter is formed. The unit may be, for example, a UV light transmission window. The unit may be machined and/or polished to remove imperfections in the fusion or junction.

In any of the processes described or exemplified herein, the clear fused quartz may comprise natural or synthetic clear fused quartz. The opaque fused quartz, including the opaque fused quartz welding rod, may comprise natural or synthetic opaque fused quartz. In highly preferred aspects, the opaque fused quartz, including the opaque fused quartz welding rod, comprises OM® 100 opaque fused quartz (Heraeus Quarzglas GmbH & Co. KG Heraeus Quarzglas Verwaltungsgesellschaft mbH).

The opaque fused quartz preferably has a nearly constant direct spectral transmission of less than approximately 5%, and more preferably less than approximately 3%, and more preferably less than approximately 2%, in the wavelength range of $\lambda=190$ nm to $\lambda=4990$ nm and for a wall thickness of 3 mm, and a diffuse reflectance of at least 60% in a wavelength range of $\lambda=190$ nm to $\lambda=2500$ nm. In some aspects, the opaque fused quartz preferably has a nearly constant direct spectral transmission of approximately 0.2 to 3%, and more preferably approximately 0.2 to 1.5% in the wavelength range of $\lambda=190$ nm to $\lambda=4990$ nm and for a 3 mm wall thickness and a diffuse reflectance of at least 60% in a wavelength range of $\lambda=190$ nm to $\lambda=2500$ nm. In some aspects, the opaque fused quartz has a nearly constant direct spectral transmission of approximately 1% in the wavelength range of $\lambda=190$ nm to $\lambda=4990$ nm and for a wall thickness of 3 mm and a diffuse reflectance of at least 60% in a wavelength range of $\lambda=190$ nm to $\lambda=2500$ nm.

The opaque fused quartz may have a density of from about 2 to about 2.3 $g/cm^3$, from about 2.05 to about 2.25 $g/cm^3$, from about 2.1 to about 2.2 $g/cm^3$, from about 2.12 to about 2.19 $g/cm^3$, from about 2.13 to about 2.19 $g/cm^3$, from about 2.14 to about 2.19 $g/cm^3$ or from about 2.15 to about 2.18 $g/cm^3$. The opaque fused quartz preferably has a density of at least about 2.10 $g/cm^3$, more preferably about 2.12 to 2.19 $g/cm^3$, and more preferably about 2.13 to 2.18 $g/cm^3$. In some aspects, the opaque fused quartz has a density of about 2.14 to 2.15 $g/cm^3$.

The pore content (porosity) of the opaque fused quartz preferably does not exceed about 5% per unit volume, and is preferably within the range of from about 0.1% to about 5% per unit volume, and more preferably within the range of from about 0.2% to about 4.5% per unit volume. In some aspect, the porosity of the opaque fused quartz does not exceed 4.7% and is within the range of from about 2% to about 4.5% per unit volume. The opaque fused quartz may have a porosity of from about 2% to about 3%, from about 2.1% to about 2.8%, from about 2.1% to about 2.6%, from about 2.1% to about 2.5%, from about 2.2% to about 2.4%, or from about 2.2% to about 2.3% per unit volume. The porosity may be about 2%, about 2.1%, about 2.2%, about 2.3%, about 2.4%, or about 2.5% per unit volume.

The opaque fused quartz may have a bubble size of less than about 25 microns (μm). The opaque fused quartz may have a bubble size of less than about 20 μm. In some preferred aspects, at least about 80% of the pores of the opaque fused quartz have a maximum pore dimension of about 60 µm or less, and more preferably from about 10 to about 45 µm, and more preferably from about 25 to about 45 µm.

The opaque fused quartz may have a Young's modulus of about 50 to about 60 kN/mm², about 51 to about 59 kN/mm², about 52 to about 58 kN/mm², or about 53 to about 55 kN/mm². The opaque fused quartz may have a Young's modulus of about 50 kN/mm², about 52 kN/mm², about 53 kN/mm², about 54 kN/mm², or about 55 kN/mm². The opaque fused quartz may have a three-point bending strength of about 80 to about 90 N/mm², about 81 to about 89 N/mm², about 82 to about 88 N/mm², about 83 to about 86 N/mm², or about 83 to about 85 N/mm². The opaque fused quartz may have a three-point bending strength of about 80 N/mm², about 82 N/mm², about 83 N/mm², about 84 N/mm², about 85 N/mm², or about 86 N/mm².

Figure 2:
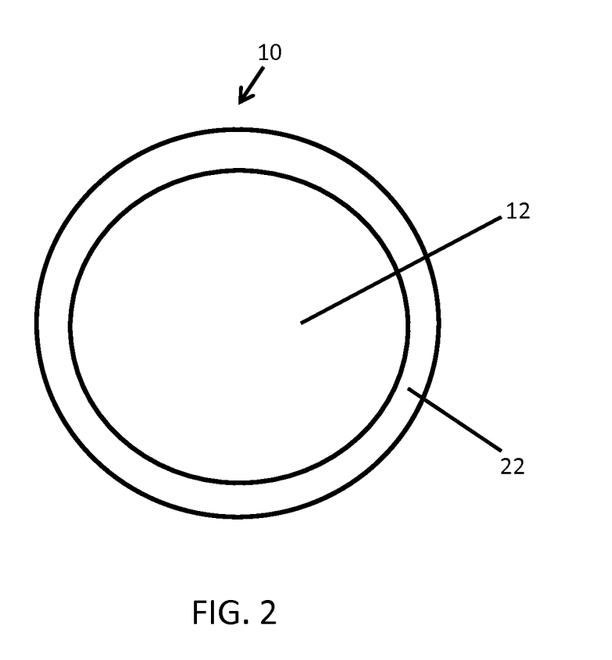
FIG. 2 shows a top view of a circular UV light transmission window, including a perimeter of opaque fused quartz surrounding a clear fused quartz center.

The processes described herein are preferably used to produce UV light transmission windows, which have a clear fused quartz center (through which UV light may pass) and an opaque fused quartz perimeter (which significantly restricts passage of UV light). A top or bottom view of such a UV light transmission window is shown in FIG. 2. In FIG. 2, the UV transmission window 10 has a circular shape, with clear fused quartz 12 in the center and opaque fused quartz 22 surrounding the clear fused quartz 12 as a perimeter.

The ratio of opaque fused quartz to clear fused quartz is relatively small. The ratio of opaque fused quartz to clear fused quartz (opaque fused quartz:clear fused quartz) may be from about 1:50 to about 1:3, from about 1:40 to about 1:5, from about 1:30 to about 1:5, from about 1:20 to about 1:5, from about 1:25 to about 1:5, from about 1:20 to about 1:5, from about 1:15 to about 1:5, from about 1:10 to about 1:5, from about 1:30 to about 1:3, from about 1:25 to about 1:3, from about 1:20 to about 1:3, from about 1:15 to about 1:3, from about 1:10 to about 1:3, from about 1:30 to about 1:4, from about 1:25 to about 1:4, from about 1:20 to about 1:4, from about 1:15 to about 1:4, from about 1:10 to about 1:4, from about 1:2 to about 1:5, from about 1:2 to about 1:4, from about 1:2 to about 1:3, from about 1:3 to about 1:6, from about 1:3 to about 1:5, from about 1:3 to about 1:4.

The UV light transmission windows produced according to the processes described herein may comprise any suitable dimensions (height/thickness, width, length, or diameter). Preferably, the UV light transmission windows comprise a total width, length, or diameter (both the clear and opaque fused quartz together) of from about 100 mm to about 1000 mm, from about 360 mm to about 390 mm, from about 365 mm to about 385 mm, from about 370 mm to about 380 mm, or from about 372 mm to about 377 mm. In some aspects, the opaque fused quartz perimeter portion has a width of from about 3 mm to about 25 mm, from about 6 mm to about 24 mm, from about 8 mm to about 15 mm, or from about 9 mm to about 11 mm. The UV light transmission windows may comprise a thickness of from about 20 mm to about 30 mm, from about 21 mm to about 29 mm, from about 22 mm to about 28 mm, from about 23 mm to about 27 mm, from about 24 mm to about 26 mm, from about 24 mm to about 28 mm, or from about 22 mm to about 26 mm. The dimensions may vary according to the dimensions of the UV light aperture of a semiconductor wafer manufacturing system.

The disclosure is not limited to the embodiments described and exemplified above, but is capable of variation and modification within the scope of the appended claims.

We claim:

1. A process for fusing an opaque fused quartz perimeter to a clear fused quartz ingot comprising placing a sleeve of opaque fused quartz in a mold, said sleeve surrounding a void having a first width and extending from the top plane of the sleeve through the bottom plane of the sleeve, inserting a clear fused quartz ingot having a second width into the void, wherein the second width is slightly narrower than the first width such that a small gap exists between the inner sidewalls of the sleeve and the outer sidewalls of the ingot, heating the mold containing the ingot and surrounding sleeve in a melting furnace, said heating taking place under a vacuum, until the opaque fused quartz fuses to the clear fused quartz ingot to form a clear fused quartz ingot comprising an opaque fused quartz perimeter, and annealing the clear fused quartz ingot comprising an opaque fused quartz perimeter so formed, wherein the opaque fused quartz sleeve comprises a density of from about 2.12 to about 2.19 g/cm³ and a porosity of from about 2% to about 4.5% per unit volume, and at least about 80% of the pores have a bubble size of from about 15 microns to about 45 microns.

2. The process according to claim 1, wherein the sleeve comprises a unitary sleeve.

3. The process according to claim 1, wherein the sleeve comprises a plurality of opaque fused quartz bands, and the heating step further fuses the bands together.

4. The process according to claim 3, wherein the clear fused quartz ingot is cylindrical in shape and the fused quartz bands are circular in shape.

5. The process according to claim 1, wherein the opaque fused quartz is OM® 100 opaque fused quartz.

6. The process according to claim 1, further comprising cutting the clear fused quartz ingot comprising an opaque fused quartz perimeter along an axis perpendicular to the vertical axis of said ingot to form slices of said ingot, then machining, polishing, or machining and polishing the slices to form a UV light transmission window comprising an opaque fused quartz perimeter having a nearly constant direct spectral transmission of approximately 0.2 to 3% in the wavelength range of $\lambda=190$ nm to $\lambda=4990$ nm, and a diffuse reflectance of at least 60% in a wavelength range of $\lambda=190$ nm to $\lambda=2500$ nm.

7. A process for fusing an opaque fused quartz perimeter to a clear fused quartz ultraviolet (UV) light transmission window, comprising machining a ledge around at least a portion of the perimeter of a clear fused quartz UV light transmission window, heating an opaque fused quartz rod through its transition temperature to soften the opaque fused quartz, depositing the softened opaque fused quartz into the ledge, and then annealing the softened opaque fused quartz within the ledge, thereby fusing the opaque fused quartz to the clear fused quartz to form a UV light transmission window comprising an opaque fused quartz perimeter having a nearly constant direct spectral transmission of approximately 0.2 to 3% in the wavelength range of $\lambda=190$ nm to $\lambda=4990$ nm, and a diffuse reflectance of at least 60% in a wavelength range of $\lambda=190$ nm to $\lambda=2500$ nm, and optionally machining or polishing the opaque fused quartz perimeter;

wherein, prior to the heating step, the opaque fused quartz rod has been pulled to reduce its original width by from about 0.5-fold to about 10-fold, and wherein the opaque fused quartz comprises a density of from about 2.12 to about 2.19 g/cm$^3$ and a porosity of from about 2% to about 4.5% per unit volume, and at least about 80% of the pores have a bubble size of from about 15 microns to about 45 microns.

8. The process according to claim 7, wherein the ledge is machined to a depth of about 3 mm.

9. The process according to claim 7, wherein the opaque fused quartz rod is OM® 100 opaque fused quartz.

10. The process according to claim 7, wherein the opaque fused quartz rod has been pulled to reduce its original width by from about 2-fold to about 5-fold.

11. The process according to claim 7, wherein the heating step is carried out in a furnace.

12. The process according to claim 7, wherein the heating step is carried out using a welding torch.

13. A process for fusing an opaque fused quartz perimeter to a clear fused quartz ingot comprising
placing a clear fused quartz ingot inside of a mold,
surrounding the clear fused quartz ingot with particles of opaque fused quartz to form a composite of a clear fused quartz ingot covered with particles of opaque fused quartz,
removing said composite from the mold, then sintering the composite, thereby fusing the opaque fused quartz particles to each other and to the clear fused quartz ingot to form a clear fused quartz ingot comprising an opaque fused quartz perimeter, and
annealing the clear fused quartz ingot comprising an opaque fused quartz perimeter so formed,
wherein the opaque fused quartz comprises a density of from about 2.12 to about 2.19 g/cm$^3$ and a porosity of from about 2% to about 4.5% per unit volume, and at least about 80% of the pores have a bubble size of from about 15 microns to about 45 microns.

14. The process according to claim 13, wherein the surrounding step comprises depositing a liquid slurry containing the particles around the ingot, and removing the fluid portion of the slurry.

15. The process according to claim 14, wherein removing the liquid portion of the slurry comprises facilitating evaporation of the liquid.

16. The process according to claim 13, wherein the clear fused quartz ingot is cylindrical in shape.

17. The process according to claim 13, wherein the opaque fused quartz particles are particles of OM® 100 opaque fused quartz.

18. The process according to claim 13, further comprising cutting the clear fused quartz ingot comprising an opaque fused quartz perimeter along an axis perpendicular to the vertical axis of said ingot to form slices of said ingot, then machining, polishing, or machining and polishing the slices to form a UV light transmission window comprising an opaque fused quartz perimeter having a nearly constant direct spectral transmission of approximately 0.2 to 3% in the wavelength range of $\lambda$=190 nm to $\lambda$=4990 nm, and a diffuse reflectance of at least 60% in a wavelength range of $\lambda$=190 nm to $\lambda$=2500 nm.

* * * * *